Dec. 5, 1961     S. J. SHAMES ET AL     3,011,725
COMBINATION COUPLING FOR USE WITH AERATOR
Filed Sept. 17, 1959
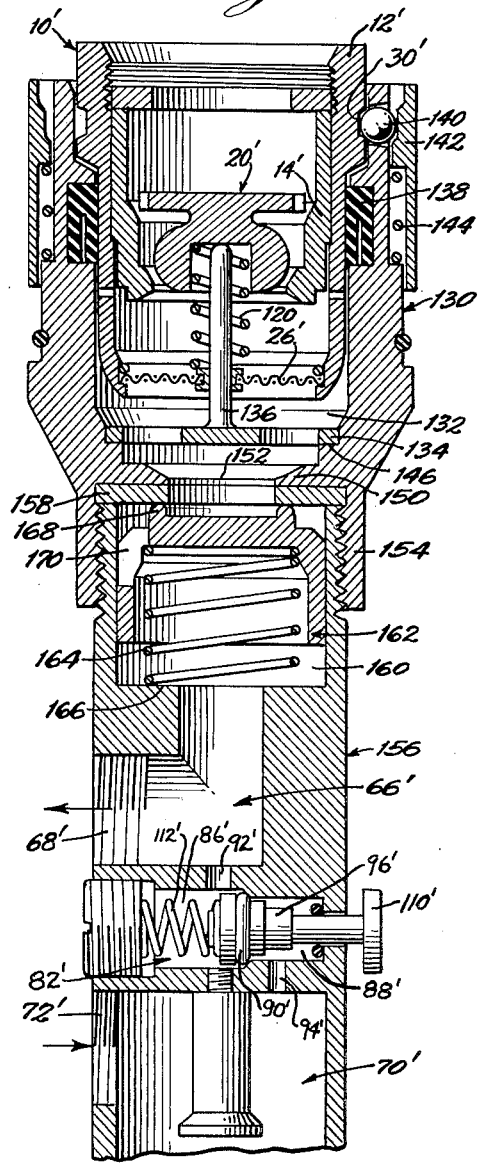
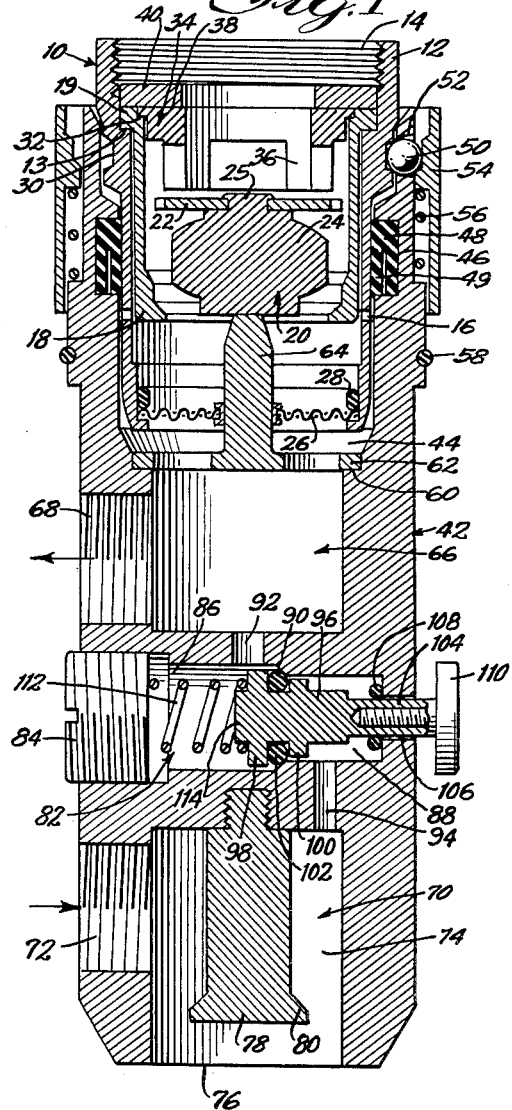
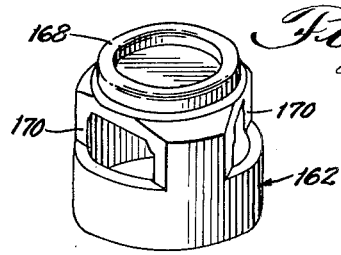
INVENTORS:
Harold Shames
and Sidney J. Shames,
BY Bair, Freeman & Molinare
ATTORNEYS.

United States Patent Office 3,011,725
Patented Dec. 5, 1961

3,011,725
COMBINATION COUPLING FOR USE
WITH AERATOR
Sidney J. Shames, 19 Agnes Circle, and Harold Shames, 5 Agnes Circle, both of Ardsley, N.Y.
Filed Sept. 17, 1959, Ser. No. 840,554
5 Claims. (Cl. 239—432)

This invention relates to a combination coupling adapted for connection to a male coupling part adapted to deliver liquid under pressure, and, more particularly, this invention relates to a combination coupling principally intended to be connected to the exterior of an aerator casing, which aerator serves as the male coupling part to which the coupling connects.

This application is a continuation-in-part of our co-pending application Serial No. 655,679, filed April 29, 1957, now Patent 2,954,936.

Combination couplings which are adapted to perform multiple functions—such as (1) for connection to a source of liquid under pressure, for the purpose of delivering the liquid under pressure to a remote appliance, and (2) for receiving liquid discharged from the remote appliance to discharge said liquid generally below the coupling part which delivers liquid under pressure—are well known in the art. Such combination couplings are frequently used for the connection of a portable dish-washing machine, or the like, to a faucet in a kitchen, and the combination coupling is thereby arranged to discharge the water returned from the dish-washing machine into the sink below the faucet.

There are two principal problems incident to the use of such prior appliance-coupling devices which are sought to be solved by the invention disclosed herein. In all prior coupling devices, the coupler is intended to connect directly to the outlet end of a faucet which is not obstructed by an aerator. This is true because an aerator normally greatly reduces the amount of liquid passed by the faucet and the dish-washer, or other appliance, requires a greater flow of water than is normally passed by an aerator. However, because aerators are so popular and widespread in use, this poses the problem of disconnecting the aerator from the faucet before being able to connect the coupling to the faucet. Furthermore, special coupling elements have to be connected to the faucet to provide means to which the coupling element may connect.

One object of this invention is to provide a combination coupling for a dish-washing machine or like appliance, which coupling is particularly adapted for co-operation with an aerator that is specially adapted to provide coupling elements on the aerator casing to which the coupler is to connect.

Another object of this invention is to provide a combination coupling of the type desired for use with dish-washing machines or the like, which coupling has elements thereon particularly adapted for cooperation with an aerator of the type which permits of greater flow therethrough when the coupler of this invention is connected thereto.

The second problem that arises with regard to couplers of this general type lies in the fact that, in disconnecting the coupler from the source of liquid under pressure, there is provided a pressure condition which could result in backflow of water under pressure from the coupler so that the pressurized water would tend to squirt in unrestrained manner from the coupler when it is disconnected from the source of liquid under pressure.

Thus, a further object of this invention is to provide a combination coupler for use with an appliance, which coupler is to be provided with means to prevent squirting of water therefrom when the coupler is disconnected from the source of liquid under pressure.

Still another object of this invention is to provide a coupler having check valve means therein which prevents the unrestrained discharge of water therefrom when the coupler is disconnected from the source of liquid under pressure.

Still a further object of this invention is to provide a coupler having novel means therein for selectively relieving the pressure of water contained in the supply portion of the coupler, prior to disconnection of the coupler from a source of liquid, so as to avoid the said problems incident to uncontrolled discharge of water from the coupler when the coupler has been removed from the source of liquid under pressure.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 1 is a vertical, axial cross-section view illustrating a coupler constructed in accordance with this invention and connected to a faucet aerator which is specially constructed to provide normal aerated water when the aerator is used as the discharge terminus of the faucet and which is designed to pass a much greater flow of water when the coupler is connected thereto.

FIGURE 2 is a vertical cross-section view of a modified form of coupler and showing a modified form of aerator to which the coupler connects.

FIGURE 3 is a perspective view of the check valve member used in the aerator of the type shown in FIGURE 2.

Referring now to the drawings, FIGURE 1 illustrates one form of appliance-coupling of this invention connected to one form of aerator, while FIGURE 2 shows a modified form of appliance-coupling connected to a modified form of aerator. In our co-pending application Serial No. 655,679, of which this application is a continuation-in-part, there is shown, as one form of device, an aerator, of the type generally shown in FIGURE 2 herein, connected to coupling elements which correspond, in part, with a portion of the coupling structure disclosed herein in FIGURE 2.

Referring first to FIGURE 1, there is shown an aerator generally indicated at 10, which includes a casing 12 having upstream and downstream ends and a sleeve-supporting shoulder 13, and the upstream end being provided with female threads 14 for connection to the threaded end of a faucet, or the like. The casing 12 is provided with lateral arcuate ports 16 through which air is normally ingested to be mixed with the water that is passing through the aerator. The aerator includes an annular, axially elongated, sleeve part 18 and a combination disc-plug part, generally indicated at 20, which parts are adapted to normally engage and cooperate, in the manner described in our co-pending application, Serial No. 655,679, and as described in our United States Patent No. 2,707,-624, to effect a sub-dividing of the incoming water by disc 22 into jets which are directed conically inwardly and downwardly by the lower portion of sleeve part 18 against the plug portion 24 of member 20. The jets of water impinging on plug 24 break up and mix with air ingested through the air inlets 16 to produce an aerated stream which discharges through the outlet end of the casing 12. Preferably, the aerator 10 is equipped with an annular splash-reducing screen 26 which is retained in position on an inturned lip at the outlet end of casing 12 by a press-fit ring 28. The exterior of the casing 12 is provided adjacent the upper end with portions which define an annular depressed recess 30 which is adapted to receive therein ball-coupler elements of a coupling part, and said coupling portions including recess 30 on casing 12 are spaced upstream of the air inlets 16 so as to define an uninterrupted outer casing portion which is adapted to be engaged by sealing means that are carried by the coupling hereinafter described.

In certain specific details of construction, the aerator herein disclosed is an improvement over prior aerators of this general type, and it is noted that the annular disc 22 is a part originally formed separate from the plug 24. The plug 24 has an upstanding stud 25 onto which the pre-formed annular disc 22 may be mounted, after which the tip of stud 25 may be spun over to clamp the disc 22 and body 24 into a unitary assembly, as shown in FIGURE 1.

The axially elongated sleeve 18, which serves to support and cooperate with the disc-plug 20 when the aerator is in its normal aerating condition, has an axially elongated upper portion which merges at its lower end into a generally ring-shaped portion of the type as disclosed in our Patent No. 2,707,624. The said elongated sleeve part 18 has an outwardly extending flange 19 adapted to be received on shoulder 13 in casing 12. The part 18 is provided adjacent its upper end with a shoulder 32 adapted to removably receive thereon a generally annular part 34 which has a plurality of downwardly extending fingers 36 which overlie member 20 and which serve as means to limit the upward movement of member 20. The part 34 also provides an annular upper surface 38 adapted to cooperate with the upper edge of sleeve part 18 to provide a relatively large surface for receiving thereon a sealing gasket 40, against which the terminal edge of a faucet, or the like, is adapted to abut when the aerator 10 is secured to a source of liquid under pressure.

Now, the coupling which connects to the aerator 10 in FIGURE 1 includes an elongated coupling body generally indicated at 42, which is shaped to define at the upper end thereof a female socket 44 for receiving therein the greater portion of the casing 12 of the aerator 10, it being understood that the greater portion of said casing 12 serves as a male coupling part to which the coupling member 42 connects. The wall of coupling 42, which partly defines the female socket 44, is recessed at 46 to receive therein a sealing gasket 48 which is adapted to engage the exterior periphery of the aerator coupling 12, at a point between the air inlets 16 and the coupling element 30. The sealing gasket 48 is partly split as shown, and permits of entry of liquid thereinto, so that the liquid itself exerts a pressure to force the innermost leg 49 of gasket 48 into sealing engagement with the exterior periphery of the male coupling part 12 to which the coupling body 42 connects.

The coupling body 42, adjacent the upper end of female socket 44 therein, is equipped with coupling elements adapted to cooperate with the recessed groove 30 in the male coupling part 12. Such coupling elements may be a plurality of balls 50 which are positioned in tapering recesses 52 defined in coupling body 42, and which balls 50 are adapted to protrude radially inwardly a distance sufficient to enter recess 30 on male coupling part 12 to effect the desired coupling connection between the parts. The balls are normally biased inwardly by a selectively retractable sleeve 54 that is spring-biased by coil spring 56 to the position normally seen in FIGURE 1. The coupling body 42 carries a removable snap ring 58, which limits the retractability of the sleeve 54, and the shape of sleeve 54 is such that while permitting retraction of balls 50 to permit de-coupling, the balls 50 are retained in recesses 52.

The coupling body 42 is provided at the lowermost portion of female socket 44 with an internal annular shoulder 60, which supports thereon an apertured spider 42 through which water freely passes, and having a central portion from which extends an upwardly protruding stem 64, the size of which stem is arranged relative to the dimensions of aerator 10 to permit of sliding entrance through the central opening in screen 26, and the length of stem 64 being such as to engage the disc-plug 20 and lift same from its normal aerating position to the position shown in FIGURE 1, wherein the disc 22 is spaced from the lowermost ring part of member 18, so as to separate the said flow-restricting parts and to permit of greater flow of liquid through the aerator 10 when the coupling body 42 is coupled to the aerator casing 12.

The coupling part 42 is formed and shaped to define therein a first flow passageway means, generally indicated at 66, which receives liquid from the aerator 10 through female socket 44 and through the flow apertures in spider 62, and which passageway means open laterally through a threaded delivery orifice 68 defined in body member 42. It is understood that an appropriate coupling of a hose member or the like may be effected through the means of the threaded orifice 68, and such a hose would deliver liquid under pressure to some liquid utilizing appliance, such as a dish-washer or the like.

The coupling body 42 also defines therein a second flow passageway means generally indicated at 70, which includes a laterally opening, threaded, discharge-receiving orifice 72 which is adapted to have a hose member, or the like, coupled thereto, which hose returns liquid from an appliance, such as a dish-washer. The orifice 72 opens into an enlarged recess 74 defined in the lower end of coupling body 42, and which recess 74 terminates in a downwardly facing coupling-discharge orifice 76. Positioned in recess 74, centrally of the walls which define said recess 74, is an axially elongated stem member 78, having a frusto-conically enlarged lower end 80. The stem 78 operates to serve as a turbulence-restricting means and anti-splash means for the water that is being discharged from the coupling body 42 to the sink therebelow, and thereby reduces irregularities in the flow which emerges from the discharge-orifice 76 of the coupling 42.

The coupling body 42 is so arranged that the delivery orifice 68 is spaced above and normally isolated from the discharge-receiving orifice 72. The portion of the body 42 between first flow passageway means 66 and second flow passageway means 70 is bored, or otherwise formed, to define a valving chamber 82 which is closed at one end by a threaded plug 84. The relief-valve chamber 82 includes a relatively large-sized, upstream, chamber portion 86 and a relatively smaller-sized, downstream, chamber portion 88, which portions are separated by a frusto-conical valve seat 90. A bore 92 communicates first flow passageway means 66 with the chamber portion 86, and a bore 94 communicates the chamber portion 88 to the second flow passageway means 70.

Positioned in the valve chamber 82 is a selectively actuatable relief-valve body 96 formed with a pair of spaced peripheral flanges 98 and 100, which define a recess therebetween in which is positioned an O-ring type gasket 102, which is adapted to seat and seal against the frusto-conical valve seat 90. The size of small flange 100 permits its sliding entry into the chamber portion 88, and the size of flange 98 provides for cooperation with the walls of chamber portion 86, so that the flanges 98 and 100 not only serve to retain the O-ring 102 in position, but also cooperate with the walls of the valve chamber 82 to maintain the parts in alignment.

The valve body 96 has an elongated, reduced stem 104 slidably extending through a lateral bore 106 in valve body 42 and extending laterally of body 42, and an O-ring type gasket 108 is provided on stem 104 to cooperate with body 42 to prevent water leakage through bore 106. The stem 104 is centrally tapped to receive therein a control button 110 which provides a manual exterior control for selectively actuating the valve body 96. The valve body 96 is normally biased to the closed position shown in FIGURE 1 by means of a coil spring 112 positioned between plug 84 and the upstream side of valve body 96. A short stud 114 on valve body 96 extends into the coils of the spring 112 to cooperate therewith to restrain the spring in position.

From the foregoing it will be understood that the relief valve 96 with gasket 108 normally is closed and serves to isolate the first passageway means 66 from the second passageway means 70. Now, when there is a high-pressure condition existing in the first flow passageway means 66 and it is desired to remove the coupler 42 from the aerator 10, the water being delivered to aerator 10 is first turned off at the faucet. Then, by selectively pressing inwardly on button 110, the relief-valve body 96 is caused to move to the left, as seen in FIGURE 1, thereby establishing communication between the first flow passageway means 66 through bore 92, valve chamber 82, and bore 94, to the second flow passageway means 70, and this permits bleeding of the high-pressure liquid from the coupling 42 so as to eliminate said pressure condition, and thereafter when the coupling 42 is selectively removed from the aerator 10, there is no inadvertent discharge of water under pressure from the coupling.

In the modified form of construction shown in FIGURE 2, the modified form of aerator generally indicated at 10' is shown as including a casing 12', an elongated sleeve, or ring, member 14', and a unitary disc-plug member 20'. The lower end of casing 12' is equipped with an annular screen 26', and the exterior of the casing is provided with a coupling-element-receiving recess 30'. The aerator in FIGURE 2 is of the automatic self-cleaning type, in that it is provided with an elongated coil spring 120 positioned between the annular screen 26' and the underside of the disc-plug member 20', and the operation of the spring is such as to normally effect movement of the disc-plug member 20' to an upper position, as generally shown in FIGURE 2, when the flow of liquid to the aerator 10' has been cut off. The self-cleaning features and operation of such a self-cleaning aerator is more fully disclosed in our Patent No. 2,896,863, and in our co-pending application, Serial No. 655,679.

The coupling which is shown in FIGURE 2 is formed of two parts and includes an upper coupling part generally indicated at 130, which is similar in many respects with the female coupling part disclosed in our co-pending application, Serial No. 655,679. The coupling part 130 defines therein a female socket 132, at the lower end of which is carried an apertured spider 134, from which extends an upwardly extending, elongated, axial stud 136 adapted to protrude through the central opening of annular screen 26', and to pass axially of the coil spring 120 to engage the under side of the disc-plug member 20' to lift said disc-plug member 20' to the upper position shown in FIGURE 2 herein, which position permits of greater flow of liquid through the aerator 10' than would normaliyy be permitted if the aerator 10' were operating to deliver its normally aerated flow.

The coupling 130 also carries therein a sealing gasket 138 adapted for cooperation with the exterior surface of the casing 12' of the aerator, and also carries thereon ball-type coupling elements 140 which may be biased to coupling engagement with the groove 30' on casing 12' by means of a selectively retractable sleeve 142 that is normally biased to the position of FIGURE 2 by coil spring 144.

Downstream of the shoulder 146, upon which is positioned the spider 134, the coupling member 130 is formed, or shaped, to define a radially inwardly extending orifice plate 150 having a central orifice 152. The coupling 130 also provides a downwardly extending sleeve 154 having female threads and being spaced radially outwardly of the underside of orifice plate 150.

The combination coupling of FIGURE 2 includes a second coupling member 156, threaded at its upper end and arranged to be connected to coupling member 130 through sleeve 154. An annular gasket 158 is positioned against the underside of orifice plate 150 and serves in part as a gasket which is clamped between the upper edge of coupling member 156 and an opposed portion of coupling 130, to effect sealing therebetween. The gasket 158 is of a dimension to extend radially inwardly of the annular upper edge of member 156 to serve as a valve seat, as more fully described hereinafter, and the dimension of the central aperture of gasket 158 is no less than the size of central aperture 152 through orifice plate 150, thereby cooperating to provide a flow passageway from the coupling body 130.

The coupling body 156 generally includes substantially the same elements seen in the lower portion of valve body 42 in FIGURE 1 in that said coupling body 156 provides therein a first flow passageway means 66' communicating with a laterally-opening, threaded, discharge orifice 68', and there is provided a second flow passageway means 70' which communicates with a laterally-opening, threaded, discharge-receiving orifice 72'. There may also be provided means, similar to the bleed means of FIGURE 1, to selectively bleed liquid under pressure from first flow passageway means 66' to second flow passageway means 70'. In FIGURE 2, the elements of the bleed means are numbered similarly to the identifying numerals applied in FIGURE 1 with the addition of prime (') marks.

What is provided in the combination coupling of FIGURE 2 in addition to what is provided in the combination coupling of FIGURE 1 is that the upper portion of coupling body 156 is shaped to define therein a check valve chamber 160, spaced downstream of female socket 132 and interposed between the orifice 152 in coupling member 130 and the first flow passageway means 66'. The chamber 160 would normally serve as a flow passageway communicating the orifice 152 with the first flow passageway means 66'. However, positioned in chamber 160 is a check-valve member of generally inverted cup-shape, and generally indicated at 162, which is normally biased toward closed position, as shown in FIGURE 2, by means of coil spring 164, which seats at its lower end on an annular shoulder 166 in body member 156 and the upper portion of said spring 164 enters the cup-shaped member 162 and engages, at its upper end, the underside of the transverse wall of check-valve 162. The transverse wall, or upper side, of check-valve member 162 is imperforate, and the upper surface thereof carries a raised rim 168 which is adapted to abut the resilient washer 158, to thereby close off communications between orifice 152 and first flow passageway means 66'. The check-valve member 162 is provided with a plurality of flow apertures 170 defined in the lateral wall thereof, located radially outwardly of rim 168.

When the water is flowing through the coupled device, the force of the water received from female socket 132 is sufficient to open the normally closed check-valve 162 against the bias of spring 164, and liquid flow is effected through the apertures 170 to flow passageway 66'. In the detaching of the combination coupling of FIGURE 2 from the aerator 10', the spring 164 and the water under pressure in first flow passageway 66' operates to close the check-valve 162 and prevent inadvertent discharge of liquid under pressure from the coupling. Alternatively, the water in the passageway 66' may be bled therefrom to second flow passageway 70' by the bleed means provided in the coupling.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new, and desire to secure by Letters Patent of the United States, is:

1. An appliance coupling for use with a male coupling part adapted to deliver liquid under pressure, said appliance coupling comprising, in combination: an upright elongated coupling body defining an upwardly opening female socket at the upper end thereof adapted to receive a male coupling part, coupling elements operatively associated with said body adjacent said female socket for selectively effecting releasable locking engagement between said female socket and a male coupling part entered therein; said body defining therein a laterally opening liquid delivery orifice, a laterally opening discharge-receiving orifice, and a downwardly opening coupling-discharge orifice that is always open to atmosphere; said coupling body defining therein a first flow passageway means communicating water under pressure from said female socket to said liquid delivery orifice, and a second flow passageway means communicating said discharge-receiving orifice with said coupling-discharge orifice that opens to atmosphere; means normally isolating said first flow passageway means from said second flow passageway means; a relief-valve-chamber in said coupling, said valve-chamber having upstream and downstream portions separated by a laterally facing valve seat means, first aperture means communicating said first flow passageway means with said upstream portion of said relief-valve-chamber, second aperture means communicating the downstream portion of said relief-valve-chamber with said second flow passageway means; and a selectively manipulable relief-valve member in said relief-valve-chamber exposed to liquid under pressure from said first aperture means to normally seat the relief-valve member with the pressure, said relief-valve member being selectively actuatable to communicate said first and second aperture means to relieve pressurized liquid conditions in said coupling before disconnecting the coupling from a male coupling part.

2. A device as set forth in claim 1 including a normally closed check valve in said first flow passageway means arranged to prevent inadvertent back flow of liquid from said first passageway means through said female socket when the appliance coupling is disconnected from a male coupling part, said check valve being spaced downstream of said female socket and being openable under pressure of liquid received from said female socket, to permit flow through said first passageway means past said check valve.

3. A device as set forth in claim 1 including stem means carried in said female socket and projecting upstream centrally thereof, and adapted for cooperation with a movable plug member of an aerating male coupling part, and anti-splash means in said second flow passageway means adjacent the coupling-discharge orifice for reducing splash and irregularities in the emergent flow of liquid from said coupling-discharge orifice.

4. An appliance coupling for use with a male coupling part adapted to deliver liquid under pressure, said appliance coupling comprising, in combination: an upright elongated coupling body defining an upwardly opening female socket at the upper end thereof adapted to receive a male coupling part, coupling elements operatively associated with said body adjacent said female socket for selectively effecting releasable locking engagement between said female socket and a male coupling part entered therein; said body defining therein a laterally opening liquid delivery orifice, a laterally opening discharge-receiving orifice, and a downwardly opening coupling-discharge orifice that is always open to atmosphere; said coupling body defining therein a first flow passageway means communicating water under pressure from said female socket to said liquid delivery orifice, and a second flow passageway means communicating said discharge-receiving orifice with said coupling-discharge orifice that opens to atmosphere; means normally isolating said first flow passageway means from said second flow passageway means; a relief-valve-chamber in said coupling, said valve-chamber having upstream and downstream portions separated by a laterally facing valve seat that faces the upstream portion of the valve-chamber; first aperture means communicating said first flow passageway means with said upstream portion of said relief-valve-chamber, second aperture means communicating the downstream portion of said relief-valve-chamber with said second flow passageway means; a laterally movable relief-valve member in the upstream portion of said relief-valve-chamber being movable toward and away from said valve seat and arranged so that the pressurized liquid in said first flow passageway means assists in seating the valve member on the valve seat, and a stem operatively associated with said valve member protruding laterally from said coupling body to afford selective manual unseating of the relief-valve member from its valve seat to relieve pressurized liquid conditions in said coupling before disconnecting the coupling from a male coupling part.

5. An appliance coupling adapted for connection to a source of liquid under pressure, said coupling comprising, in combination: body means defining an upwardly opening receiving aperture adapted to receive liquid under pressure, coupling elements on said body means adapted for selectively connecting the body means to a source of liquid under pressure, said body means also defining a laterally opening liquid delivery orifice, a laterally opening discharge-receiving orifice, and a downwardly opening coupling-discharge orifice that is always open to atmosphere; said body means defining a first flow passageway means communicating water under pressure from said receiving aperture to said liquid delivery orifice, and a second flow passageway means separate from said first flow passageway means communicating said discharge-receiving orifice with said coupling-discharge orifice that opens to atmosphere; and relief valve means for selectively discharging pressurized liquid from said first flow passageway means to atmosphere before selectively disconnecting the appliance coupling from a source of liquid, said relief-valve means including a laterally facing valve seat means that is exposed to the liquid pressure obtained in said first flow passageway means, a selectively laterally movable relief-valve member exposed to the liquid pressure that obtains in said first flow passageway means so that said pressurized liquid in the first flow passageway means assists in normally seating said relief-valve member with the pressure against said valve seat means, a relief-flow passageway means that is always open to atmosphere, and said relief-valve member being selectively movable laterally against the liquid pressure to a position away from said valve seat means, so as to selectively communicate the first flow passageway means past the valve seat means to said relief-flow passageway means that opens to atmosphere.

References Cited in the file of this patent

UNITED STATES PATENTS

| | | |
|---|---|---|
| 686,098 | Martin | Nov. 5, 1901 |
| 2,621,976 | Sliepcovich | Dec. 16, 1952 |
| 2,707,624 | Shames et al. | May 3, 1955 |
| 2,837,323 | Goodrie | June 3, 1958 |
| 2,896,863 | Shames et al. | July 28, 1959 |
| 2,954,936 | Shames et al. | Oct. 4, 1960 |